United States Patent [19]

Matsuda

[11] Patent Number: 4,499,543
[45] Date of Patent: Feb. 12, 1985

[54] ANTI-SKID BRAKE CONTROL SYSTEM WITH FAIL-SAFE ARRANGEMENT

[75] Inventor: Toshiro Matsuda, Zama, Japan

[73] Assignee: Nissan Motor Company, Limited, Yokohama, Japan

[21] Appl. No.: 423,187

[22] Filed: Sep. 24, 1982

[30] Foreign Application Priority Data

Sep. 28, 1981 [JP] Japan ................................ 56-152164

[51] Int. Cl.³ ............................................... B60T 8/00
[52] U.S. Cl. ..................................... 364/426; 303/92; 303/93; 303/110
[58] Field of Search .................... 364/426; 303/92, 93, 303/110

[56] References Cited

U.S. PATENT DOCUMENTS 3,637,264  1/1972  Leiber et al. .......................... 303/105
3,744,851  7/1973  Burckhardt et al. ................ 303/106
4,113,321  9/1978  Bleckmann ............................ 303/92

Primary Examiner—B. Dobeck
Assistant Examiner—Saul M. Bergmann
Attorney, Agent, or Firm—Schwartz, Jeffery, Schwaab, Mack, Blumenthal & Koch

[57] ABSTRACT

In a fail-safe arrangement for an anti-skid brake control system, several related pairs of sensor and control signals are produced only in certain possible combinations. The fail-safe arrangement checks each pair of signals and produces an error signal if a non-conventional combination of any of the pairs of signals occurs. In response to the error signal, the automatic anti-skid control system is disabled in such a way as to allow continued manual brake operation.

14 Claims, 3 Drawing Figures

4,499,543

ANTI-SKID BRAKE CONTROL SYSTEM WITH FAIL-SAFE ARRANGEMENT

BACKGROUND OF THE INVENTION

The present invention relates generally to an anti-skid brake control system for an automotive vehicle. Specifically, the invention relates to a fail-safe arrangement in an anti-skid brake control system adapted to monitor each of the segments in the control system in order to stop skid control when a fault in one of the segments is detected.

As is well known, it is better not to lock the wheels of a vehicle during braking. Particularly, in order to shorten braking distance to stop the vehicle effectively, wheel-to-road friction λ must be maintained within a given slip-ratio range. In practice, it is considered that the shortest braking distance can be obtained when the slip ratio λ is about 15% vis-a-vis the vehicle speed. In order to keep the slip ratio within the desired range, it is necessary to control application and release of fluid pressure in the actuating cylinders of a hydraulic brake system.

On the other hand, if the anti-skid control system fails the vehicle wheels may lock and significantly degrade the braking distance or the brakes may remain in the released position in spite of the brake pedal being depressed. This can cause serious danger for the vehicle passengers as well as the driver.

Therefore, a fail-safe arrangement for permitting adequate performance of the braking operation even when the anti-skid control system fails would be very desirable.

SUMMARY OF THE INVENTION

It is, therefore, an object of the present invention to provide an automotive anti-skid control system with a fail-safe arrangement which can detect abnormal operation of the control system, and in response disable the control system and switch the braking control to manual operation so that braking pressure can be adjusted manually.

According to the present invention, there is provided an anti-skid brake control system with a fail-safe arrangement, which includes a wheel rotation sensor for detecting the angular velocity of one of the vehicle wheels.

BRIEF DESCRIPTION OF THE DRAWINGS

The present invention will be understood more fully from the detailed description of the invention given herebelow and from the accompanying drawings of the invention, which, however, should not be taken as limitative of the invention but for elucidation and explanation only.

In the drawings.

DESCRIPTION OF THE PREFERRED EMBODIMENTS

In advance of the description of the preferred embodiment of an anti-skid control system according to the present invention, general anti-skid operation will be described for better understanding of the invention, with reference to FIG. 1. Such anti-skid control has been disclosed in the U.S. Pat. No. 3,744,851 issued on July 10, 1973 to M. H. Burchardt et al. In this U.S. Patent, there is disclosed a Brake Force Regulating System for vehicles, especially for motor vehicles, for anti-skid controlling the brake force based on the rotation speed of a wheel, wheel slippage and wheel acceleration. The disclosure of this U.S. Patent is herewith incorporated by reference.

In this anti-skid control method, first and second threshold values $Vc_1$ and $Vc_2$ are determined by multiplying vehicle speed Vc by two predetermined coefficients. The first and second thresholds $Vc_1$ and $Vc_2$ define wheel slippage ranges $\lambda_0$, $\lambda_1$ and $\lambda_2$. Further, a wheel acceleration is determined from a variation of the wheel rotation speed $V_w$, which wheel acceleration is used to detect the wheel accelerating or decelerating.

The wheel rotation speed $V_w$ is distinguished with respect to the foregoing slippage ranges $\lambda_0$, $\lambda_1$ and $\lambda_2$. As will be appreciated, when the wheel is decelerating and the wheel rotation speed drops below the first threshold $Vc_1$, a $\lambda_1$ signal goes HIGH. Then, as the wheel rotation speed further decelerates and drops below the second threshold $Vc_2$, a $\lambda_2$ signal goes HIGH.

On the other hand, if the wheel rotation speed increases beyond the second threshold $Vc_2$, the $\lambda_2$ signal level goes LOW and as the wheel rotation speed further increases beyond the first threshold $Vc_1$, the $\lambda_1$ signal level goes LOW.

Figure 1:
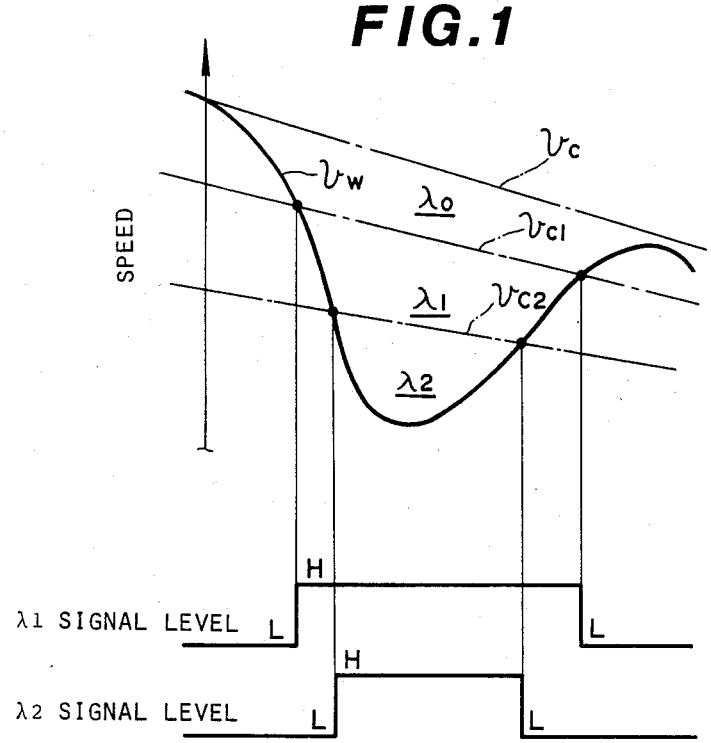
FIG. 1 is a timing chart in an anti-skid control to show a variation of the rotational speed of a wheel in relation to given signal levels.

Here, as will be appreciated from FIG. 1, there is no wheel rotation speed at which the $\lambda_1$ signal will be LOW and the $\lambda_2$ signal will be HIGH. Therefore, if such a signal condition occurs, it shows that the anti-skid control system is malfunctioning. The fail-safe arrangement according to the present invention is intended to detect such errors in the anti-skid control system and perform the fail-safe operation in response thereto.

Figure 2:
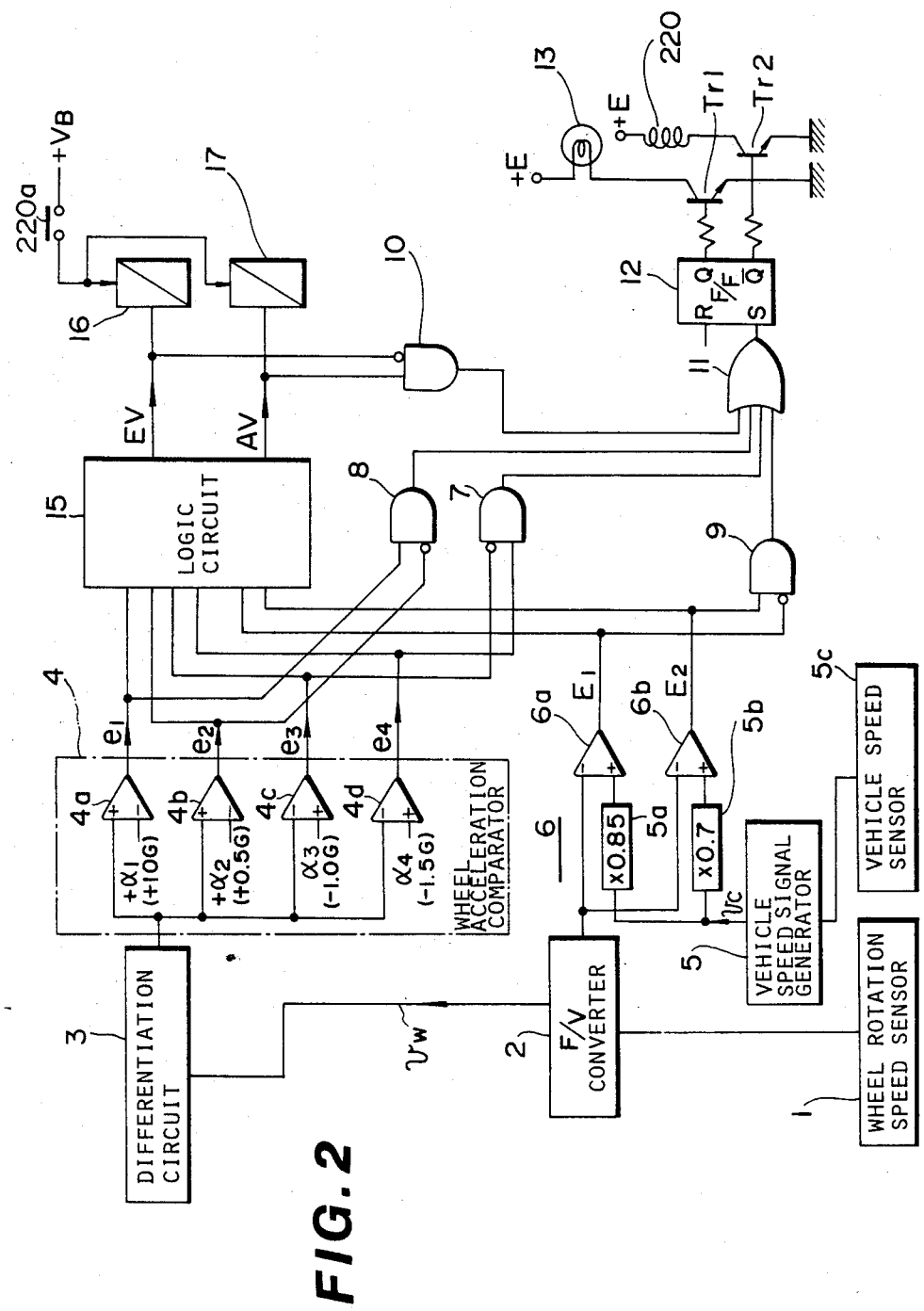
FIG. 2 is a circuit diagram of the preferred embodiment of the anti-skid control system with a fail-safe arrangement according to the present invention.

Referring now to FIG. 2, there is illustrated the preferred embodiment of an anti-skid control system with the fail-safe arrangement of the present invention. A wheel rotation speed sensor 1 is adapted to produce a pulse train with a frequency proportional to the wheel rotation speed. The pulse train is converted into an analog signal by a frequency-to-voltage converter (F/V converter) 2, which analog signal $V_w$ has a voltage proportional to the wheel rotation speed. Based on the variation of the analog signal value, a differentiation circuit 3 produces a signal $\alpha_w$ at a voltage representative of instantaneous wheel acceleration. The signal $\alpha_w$ is fed to a wheel acceleration comparator 4 which comprises first to fourth differential amplifiers 4a to 4d. The signal $\alpha_w$ is inputted to the positive input terminals (+) of the first and second differential amplifiers 4a and 4b and to the negative input terminals (−) of the differential amplifiers 4c and 4d. The negative input terminals of the differential amplifiers 4a and 4b respectively receive reference voltages $\alpha_1$ and $\alpha_2$ corresponding to acceleration levels of 1.0G and 0.5G. On the other hand, the positive input terminals of the differential amplifiers 4c and 4d receive reference voltages $a_3$ and $a_4$ respectively corresponding to acceleration levels of $-1.0$G and $-1.5$G. Therefore, when the signal value of the signal $a_w$ is greater than the reference voltages $a_1$ and $a_2$, the outputs $e_1$ and $e_2$ of the differential amplifiers 4a and 4b will be HIGH and outputs $e_3$ and $e_4$ of the remaining differential amplifiers 4c and 4d will be maintained at LOW level. When the wheel acceleration drops to less than 1.0G but is still greater than 0.5G, then the output $e_1$ of the differential amplifier 4a turns to LOW level and the output $e_2$ is maintained at HIGH level.

On the other hand, when the wheel acceleration $a_w$ is in the range between 0.5G and $-1.0$G, the outputs of all the differential amplifiers 4a to 4d are LOW level. As the wheel decelerates and thus, the signal value $a_w$ of the signal $a_w$ drops to a value less than the reference voltage $a_3$, the output $e_3$ of the differential amplifier 4c goes HIGH and the other output signals remain LOW. As the wheel decelerates further to become lower than $-1.5$G and thus the voltage of the signal $a_w$ drops below the reference voltage $a_4$, then the outputs $e_3$ and $e_4$ both go HIGH. The outputs of the differential amplifiers 4a to 4d in relation to the wheel acceleration $a_w$ are summarized in the following table:

| | $a_w$ | | | | |
|---|---|---|---|---|---|
| | $a_w > +a_1$ | $+a_1 > a_w > +a_2$ | $+a_2 > a_w > a_3$ | $a_3 > a_w > a_4$ | $a_4 > a_w$ |
| 4a ($e_1$) | H | L | L | L | L |
| 4b ($e_2$) | H | H | L | L | L |
| 4c ($e_3$) | L | L | L | H | H |
| 4d ($e_4$) | L | L | L | L | H |

As will be appreciated, all combinations of the outputs $e_1$ to $e_4$ which actually correspond to detected accelerations are shown hereabove. If a combination different from the shown five combinations occurs, it means that the anti-skid control is malfunctioning. Therefore, by detecting combinations different from the foregoing five combinations, errors in the anti-skid control can be detected.

On the other hand, a vehicle speed sensor 5c produces a vehicle speed signal indicative of the vehicle speed. The vehicle speed signal is fed to a vehicle speed signal generator 5 which is adapted to produce a reference signal Vc at a voltage related to vehicle speed and which changes at a rate related to vehicle acceleration. The reference signal Vc is fed to reference voltage generators 5a and 5b. The reference voltage generator 5a produces a reference voltage $Vc_1$ having a value corresponding to 85% of the signal value of the reference signal Vc. On the other hand, the reference voltage generator 5b produces a reference voltage $Vc_2$ having a value corresponding to 70% of the signal value of the reference signal Vc. The reference voltage generators 5a and 5b are respectively connected to positive input terminals of differential amplifiers 6a and 6b. The analog signal $V_w$ representative of the wheel rotation speed is also inputted to the negative input terminals of the differential amplifiers 6a and 6b. The differential amplifiers 6a and 6b vary the level of the outputs $E_1$ and $E_2$ depending on the slippage of the wheel determined on the basis of the reference voltages $Vc_1$ and $Vc_2$. The variation of the output level of the differential amplifiers 6a and 6b with respect to the variation of the analog signal $V_w$ in relation to the reference voltages $Vc_1$ and $Vc_2$ is illustrated in the following table:

| | $V_w$ | | |
|---|---|---|---|
| | $\lambda_0$ (Vw > 0.85Vc) | $\lambda_1$ (0.8sVc < Vw < 0.7Vc) | $\lambda_2$ (0.7Vc > Vw) |
| 6a ($E_1$) | L | H | H |
| 6b ($E_2$) | L | L | H |

The outputs $e_1$ to $e_4$ and $E_1$ and $E_2$ are fed to a logic circuit 15. The logic circuit 15 determines the signal level of an inlet signal $E_v$ and an outlet signal $A_v$ according to the following chart:

| $e_1$ | $e_2$ | $e_3$ | $e_4$ | $E_1$ | $E_2$ | $E_v$ | $A_v$ |
|---|---|---|---|---|---|---|---|
| H | H | L | L | L | L | L | L |
| L | H | L | L | L | L | L | L |
| L | L | L | L | L | L | L | L |
| L | L | H | L | L | L | H | L |
| L | L | H | H | L | L | H | H |
| H | H | L | L | H | L | H | L |
| L | H | L | L | H | L | H | L |
| L | L | L | L | H | L | H | L |
| L | L | H | L | H | L | H | L |
| L | L | H | H | H | L | H | H |
| H | H | L | L | H | H | H | L |
| L | H | L | L | H | H | L | L |
| L | L | L | L | H | H | H | L |
| L | L | H | L | H | H | H | H |
| L | L | H | H | H | H | H | H |

The function or distinction in the logic circuit has been illustrated in detail in the above-referred U.S. Pat. No. 3,744,851.

Figure 3:
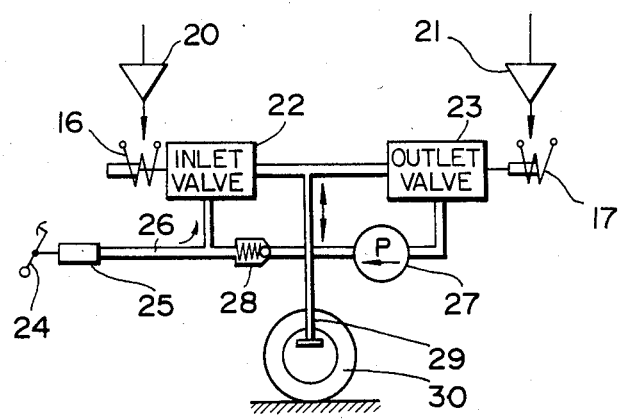
FIG. 3 is a block diagram of a hydraulic brake system suitable for control by the anti-skid control system employing the fail-safe arrangement of the present invention.

Referring to FIG. 3, when the inlet signal $E_v$ and the outlet signal $A_v$ are both LOW, the brake pressure to be applied to wheel cylinders 29 provided for each vehicle wheel 30 is increased. When the inlet signal $E_v$ goes HIGH and the outlet signal $A_v$ remains LOW, the brake pressure is held constant. When the inlet signal $E_v$ and the outlet signal $A_v$ are both HIGH, the brake pressure is reduced.

To carry out the foregoing anti-skid brake control operation, the brake system is provided with an inlet valve 22 and an outlet valve 23 in the hydraulic circuit. The inlet valve 22 includes an inlet valve actuator 16 and the outlet valve 23 includes an outlet valve actuator 17, as shown in FIG. 3. The inlet valve 22 is connected to a brake master cylinder 25 to receive a working fluid through a passage 26 and is also connected to the wheel cylinder 29 to apply the working fluid thereto. The master cylinder 25 responds to depression of an associated brake pedal 24 to increase the fluid pressure within passage 26. The working fluid is thus fed to the wheel cylinder 29 when a brake pedal 24 is depressed and the inlet valve 22 is opened. The inlet valve actuator 16 is responsive to the HIGH-level inlet signal $E_v$ to be energized and close the inlet valve. On the other hand, the outlet valve 23 is a normally closed valve and is responsive to energization of the outlet valve actuator 17 to open in response to the outlet signal $A_v$. When the inlet valve 22 and the outlet valve 23 are both closed, the fluid pressure applied to the wheel cylinder 29 is maintained at a constant level.

The outlet valve 23 is connected to the brake master cylinder 25 via a fluid pump 27 and an one-way valve 28. When the outlet valve 23 is open the working fluid in the passage between inlet valve 22 and wheel cylinder 29 is fed back to the master cylinder 25 through the fluid pump 27 and the one-way valve 28. Thus, the fluid pressure applied to the wheel cylinder 29 is decreased to release the brake pressure. The inlet and outlet valve actuators 16 and 17 are respectively operated by switches 20 and 21 which are turned on in response to the inlet and outlet signals $E_v$ and $A_v$.

Returning to FIG. 2, the fail-safe operation is carried out after detection of errors in the anti-skid brake control. In order to detect errors in the anti-skid brake control, AND gates 7 and 8 are provided. The AND gate 7 has an input terminal connected to the differential amplifier 4d and an inverting input terminal connected to the differential amplifier 4c. As will be appreciated from the foregoing table, there are no allowable output conditions in which the output $e_3$ of the differential amplifier 4c is LOW and the output $e_4$ of the differential amplifier 4d is HIGH, therefore, if the AND gate 7 outputs a HIGH signal, it means the anti-skid brake control system is malfunctioning. Likewise, by connecting the differential amplifiers 4a and 4b to the AND gate 8 via an input terminal and an inverting input terminal respectively, errors in the control system can be detected.

The AND gates 7 and 8 produce HIGH level signals only when the acceleration comparator is malfunctioning. The output terminals of the AND gates 7 and 8 are connected to the SET input terminal S of an R-S-type flip-flop 12 via an OR gate 11. When the SET terminal receives a HIGH-level input, the flip-flop 12 produces a SET signal at its Q-output terminal to turn ON a transistor $Tr_1$ to illuminate a fault indicator lamp 13 and stops producing a RESET signal at its $\overline{Q}$-output terminal to turn OFF another transistor $Tr_2$ to de-energize a relay coil 220 which opens a relay switch 220a and thereby disables the anti-skid control operation of the inlet and outlet valve actuators 16 and 17.

Likewise, an AND gate 9 is connected to the differential amplifiers 6a and 6b to receive the outputs $E_1$ and $E_2$. One of the input terminals of the AND gate 9 is an inverting input terminal connected to the differential amplifier 6a. Thus, the AND gate outputs a HIGH-level signal when the output $E_1$ of the differential amplifier 6a is LOW and the output $E_2$ of the differential amplifier 6b is HIGH, which is not possible under normal circumstances. The AND gate is also connected to the SET terminal of the flip-flop 12 via the OR gate 11 in order to disconnect the anti-skid control system when such an erroneous combination of control signals is detected.

Another AND gate 10 is connected to the flip-flop 12 via the OR gate 11 for fail-safe purposes. The AND gate 10 is connected to the logic circuit 15 to receive the outlet signal $A_v$ at one input terminal and the inlet signal $E_v$ at an inverting input terminal. As will be appreciated from the foregoing table, it is not possible to have the inlet signal $E_v$ LOW and the outlet signal $A_v$ HIGH. Therefore, by detecting this condition, malfunction of the control system can be detected and by deactivating the relay coil 220, fail-safe operation can be performed.

It should be noted that when the relay switch 18a is opened an thus both of the inlet and outlet valve actuators 16 and 17 are disabled, the inlet valve 22 remains open and the outlet valve 23 remains closed in order to enable manual braking.

It should be additionally noted that the flip-flop 12 should be RESET initially in order to enable automatic anti-skid control. This can be realized in any of a number of ways which will occur to those skilled in the art.

As set forth, according to the present invention, errors in the anti-skid control system can be satisfactorily detected and fail-safe operation can be performed by disabling the control system.

Although the invention has been described in detail with respect to the specific embodiment, the invention can be embodied otherwise in many ways without departing from the principle of the present invention. Therefore, the invention should be understood to include all of the possible modifications and embodiments which can achieve the sought operation of the invention and has corresponding features.

What is claimed is:

1. An anti-skid brake control system for an automotive vehicle, comprising:
  a detector associated with a wheel of said vehicle for detecting acceleration of said wheel and for producing an acceleration indicative signal having a value indicative of said detected wheel acceleration;
  a reference signal generator for producing a plurality of reference signals, each differing in value from any of the other reference signals of said plurality of reference signals, and each representing a threshold value to be compared with the value of said acceleration indicative signal;
  a comparator for respectively comparing the value of said acceleration indicative signal with the value of each of said plurality of reference signals and for producing a comparator signal which is a discrete combination of a plurality of outputs, each of said outputs resulting from a corresponding one of said respective comparisons;
  a control signal generator responsive to said comparator signal for producing a control signal for controlling braking operation, said control signal having a value derived on the basis of the combination of said outputs; and
  a fault detector responsive to said comparator signal for detecting whether said combination of outputs is a member of a predetermined set all possible combinations occurring in a non-malfunctioning control system, and for producing a fault signal whenever said combination of outputs constituting said comparator signal is detected not to be a member of said set, said fault signal being useable to demand a predetermined back-up operation.

2. An anti-skid brake control system for a vehicle having a brake system, comprising:
  a sensor associated with a wheel of said vehicle for sensing the acceleration of said wheel and for deriving an acceleration indicative signal having a value representative of said sensed wheel acceleration;
  a detector responsive to said acceleration indicative signal for producing a condition indicative signal having a value which varies with the acceleration and deceleration of said vehicle wheel, said acceleration and deceleration condition being detected on the basis of said acceleration indicative signal value;
  a controller responsive to said condition indicative signal for deriving a control signal controlling operation of said brake system and optimizing braking operation; and a fault detector for detecting whether the value of said condition indicative signal value varies from predetermined values which are representative of all of the possible conditions occurring in non-malfunctioning brake control operation, and for producing a fault signal whenever said value of said condition indicative signal is detected to vary from said predetermined values.

3. The system as set forth in claim 1 or 2, wherein said reference signal generator determines at least two different slippage reference signals, and said sensing means comprises at least two comparators for comparing wheel slippage with said slippage reference signals and for producing comparator signals which define a wheel slipping condition in preselected combinations of said comparator signals.

4. The system as set forth in claim 3, wherein said fault detector comprises an AND gate connected to said comparators in such a manner that it produces said fault signal when abnormal combination out of said preselected combinations of said comparator signals is detected.

5. The system as set forth in claim 4, which further comprises means for disabling anti-skid control in response to said fault signal.

6. The system as set forth in claim 5, which further comprises a control valve controlling a hydraulic brake pressure, and said disabling means is adapted to disable said control valve operation.

7. The system as set forth in claim 1 or 2, wherein said reference signal generator comprises means for determining different acceleration and deceleration reference signals, and said sensing means comprises at least two comparators respectively comparing wheel acceleration and deceleration with said reference signals and producing comparator signals which define, in combination, a wheel slipping condition.

8. The system as set forth in claim 7, wherein said fault detector comprises an AND gate connected to said comparators in such a manner that said AND gate produces said fault signal when a combination indicating a malfunction is detected.

9. The system as set forth in claim 8, which further comprises means for disabling anti-skid control in response to said fault signal.

10. The system as set forth in claim 9, which further comprises a control valve controlling a hydraulic brake pressure, and said disabling means is adapted to disable said control valve operation.

11. A fail-safe arrangement for an anti-skid brake control system applied to a vehicle brake system, comprising:
(a) at least one brake condition sensing means associated with a single wheel for sensing a vehicle operating condition pertaining to braking and outputting a plurality of sensor signals indicative thereof, the sensor signals being so produced that specific combinations of sensor signal values will not occur when said sensing means is functioning properly;
(b) logic means responsive to the sensor signals for outputting at least one control signal in accordance with the sensor signals;
(c) anti-skid actuating means responsive to the control signal for actuating and controlling the anti-skid brake control system in accordance with the control signal;
(d) detecting means for monitoring the sensor signals, detecting combinations thereof matching one of said specific combinations, and for outputting an error signal when the combination of said sensor signal values is one of said specific combinations; and
(e) a fail-safe device for preventing operation of said anti-skid actuating means in response to the error signal while allowing manual operation of the vehicular brake system.

12. The fail-safe arrangement of claim 11, wherein said logic means outputs at least two control signals in such a manner that only specific combinations of the control signals will occur when said logic means is functioning properly, and wherein said detecting means additionally outputs the error signal when the combination of the control signals is not one of said specific combinations.

13. A fail-safe arrangement for an anti-skid brake control system applied to a vehicle brake system, comprising:
(a) at least one brake condition sensing means associated with a single wheel for sensing a vehicle operating condition pertaining to braking, and for outputting a sensor signal made up of first pairs of binary signals indicative of said sensed vehicle operating condition, the sensor signal being so outputted that a first set of specific combinations of values of said first pairs of binary signals will not occur when said sensing means is not malfunctioning;
(b) logic means responsive to the sensor signal for outputting a control signal in accordance with the sensor signal, said control signal being made up of second pairs of binary signals in such a manner that a second set of specific combinations of values of said second pairs of binary signals will not occur when said one of said sensing means and said logic means is not malfunctioning;
(c) anti-skid actuating means responsive to the sensor signal for actuating and controlling the anti-skid brake control system in accordance with the sensor signal;
(c) detecting means for monitoring the sensor signal, for detecting combinations thereof matching one of said first set of specific combinations, for monitoring said control signal, for detecting combinations thereof matching one of said second set of specific combinations, for outputting an error signal when the combination of said sensor signal values is one of said first set of specific combinations, and for outputting an error signal when the combination of said control signal values is one of said second set of specific combinations, said detecting means comprising a plurality of AND gates, each of which receives as inputs a respective pair of binary values from a set of binary values consisting of said first pairs of binary values and said second pairs of binary values, with inverters provided at selected input terminals thereof such that at least one AND gate outputs a high-level signal in response to the presence of a specific combination, from one of said first and said second sets of specific combinations and an OR gate receiving as inputs the outputs of the AND gates and outputting the error signal in response to a high-level signal from any one of the AND gates;
(e) a fail-safe device for preventing operation of said actuating means in response to the error signal while allowing manual operation of the vehicular brake system.

14. The fail-safe arrangement of claim 11, 12, or 13, further comprising display means for indicating to vehicle occupants that the anti-skid brake control system is malfunctioning in response to the error signal.

* * * * *